United States Patent
Mori et al.

(10) Patent No.: US 9,253,305 B2
(45) Date of Patent: Feb. 2, 2016

(54) IMAGE-BASED ADDRESSING OF PHYSICAL CONTENT FOR ELECTRONIC COMMUNICATION

(75) Inventors: Koichi Mori, San Jose, CA (US); Hayes Raffle, Palo Alto, CA (US); Rafael A. Ballagas, Palo Alto, CA (US); Hiroshi Horii, Burlingame, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/048,659

(22) Filed: Mar. 15, 2011

(65) Prior Publication Data
US 2011/0223970 A1 Sep. 15, 2011

Related U.S. Application Data (60) Provisional application No. 61/313,924, filed on Mar. 15, 2010.

(51) Int. Cl.
*H04M 1/00* (2006.01)
*H04W 24/00* (2009.01)
(Continued)

(52) U.S. Cl.
CPC ........ *H04M 1/72552* (2013.01); *H04M 1/2755* (2013.01); *H04N 1/0036* (2013.01); *H04N 1/00307* (2013.01); *H04N 1/00326* (2013.01); *H04N 1/00331* (2013.01); *H04N 1/00336* (2013.01); *H04N 1/00355* (2013.01); *H04N 1/00374* (2013.01); *H04N 1/32037* (2013.01); *H04N 1/32096* (2013.01); *H04M 1/72555* (2013.01); *H04M 2250/52* (2013.01); *H04N 2201/0096* (2013.01)

(58) Field of Classification Search
CPC .................................................. H04M 1/2755
USPC ........................................................ 455/556.1
See application file for complete search history.

(56) References Cited

U.S. PATENT DOCUMENTS

2003/0025944 A1* 2/2003 Burke ........................... 358/405
2003/0115286 A1 6/2003 Mayle et al.
(Continued)

FOREIGN PATENT DOCUMENTS

CN 1685371 A 10/2005
CN 1783073 A 6/2006
(Continued)

OTHER PUBLICATIONS

International Search Report and Written Opinion, received in corresponding Patent Cooperation Treaty Application No. PCT/IB2011/051089. Dated Jun. 20, 2011. 11 pages.
(Continued)

*Primary Examiner* — Lester Kincaid
*Assistant Examiner* — Andy Gu
(74) *Attorney, Agent, or Firm* — Banner & Witcoff, Ltd.

(57) ABSTRACT

In one exemplary embodiment, a method includes: capturing image data for physical content, where the physical content includes a recipient image indicative of at least one desired recipient; performing image recognition on the captured image data to identify the recipient image; matching the recipient image with corresponding contact information to obtain address information for the at least one desired recipient; and addressing an electronic communication to the at least one desired recipient using the address information, where the electronic communication includes the captured image data for the physical content.

24 Claims, 6 Drawing Sheets

(51) Int. Cl.
*H04W 4/00* (2009.01)
*H04M 1/725* (2006.01)
*H04M 1/2755* (2006.01)
*H04N 1/00* (2006.01)
*H04N 1/32* (2006.01)

(56) References Cited

U.S. PATENT DOCUMENTS

| | | | |
|---|---|---|---|
| 2004/0061733 A1* | 4/2004 | Buibas et al. | 347/19 |
| 2004/0178128 A1* | 9/2004 | O'Connell et al. | 209/584 |
| 2005/0201374 A1* | 9/2005 | Marce et al. | 370/389 |
| 2005/0280502 A1* | 12/2005 | Bell | 340/5.83 |
| 2006/0063514 A1* | 3/2006 | Choi et al. | 455/414.1 |
| 2007/0011245 A1* | 1/2007 | Kawashima et al. | 709/206 |
| 2008/0273749 A1 | 11/2008 | Rundle et al. | |
| 2009/0185240 A1* | 7/2009 | Kato et al. | 358/474 |
| 2009/0196529 A1* | 8/2009 | Su et al. | 382/306 |
| 2009/0247227 A1* | 10/2009 | Silverbrook et al. | 455/557 |
| 2009/0271872 A1* | 10/2009 | Ishizuka et al. | 726/28 |
| 2011/0026778 A1* | 2/2011 | Ye | 382/118 |
| 2011/0099486 A1* | 4/2011 | Nesladek et al. | 715/753 |
| 2011/0129153 A1* | 6/2011 | Petrou et al. | 382/182 |
| 2012/0021786 A1* | 1/2012 | Hou et al. | 455/466 |

FOREIGN PATENT DOCUMENTS

| | | |
|---|---|---|
| EP | 1271970 A1 | 1/2003 |
| WO | 2004029885 A1 | 4/2004 |
| WO | 2006025797 A1 | 3/2006 |

OTHER PUBLICATIONS

Oct. 29, 2014—(CN) Office Action—App 201180021018.4.
Jul. 8, 2015—(CN) Second Office Action—App 201180021018.4.

* cited by examiner

IMAGE-BASED ADDRESSING OF PHYSICAL CONTENT FOR ELECTRONIC COMMUNICATION

RELATED APPLICATION

This patent application claims priority under 35 U.S.C. §119(e) from U.S. Provisional Patent Application No. 61/313,924, filed Mar. 15, 2010, the disclosure of which is incorporated by reference herein in its entirety.

TECHNICAL FIELD

The exemplary and non-limiting embodiments of this invention relate generally to electronic communication systems, apparatus, methods and computer program products and, more specifically, relate to the addressing of content for electronic communication.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Electronic devices and media enable additional methods and techniques for communication, such as wireless phones, e-mail and text messaging, as non-limiting examples. In view of such electronic communications, electronic devices can provide users with recognizable interfaces to allow ready usage of and access to these techniques. For example, the device can allow a user to originate a phone call by selecting an image on a touch screen. As another example, contact information can be associated with an image or photograph (e.g., of the individual in question) and vice-versa. Such an association can make it easier for a user to select a desired address or contact the individual (e.g., while viewing a photograph containing the individual).

Electronic devices and media also may be used to assist with customization and provisioning of traditional, previously non-electronic communications, such as mail. For example, electronic devices and systems can be used to provide customized or vanity postage stamps. As another example, electronic devices and systems can enable a user to print stamps at their own printer and have an account that is correspondingly debited.

SUMMARY

The below summary section is intended to be merely exemplary and non-limiting.

In one exemplary embodiment of the invention, a method comprising: capturing image data for physical content, where the physical content includes a recipient image indicative of at least one desired recipient; performing image recognition on the captured image data to identify the recipient image; matching the recipient image with corresponding contact information to obtain address information for the at least one desired recipient; and addressing an electronic communication to the at least one desired recipient using the address information, where the electronic communication comprises the captured image data for the physical content.

In another exemplary embodiment of the invention, a program storage device readable by a machine, tangibly embodying a program of instructions executable by the machine for performing operations, said operations comprising: capturing image data for physical content, where the physical content includes a recipient image indicative of at least one desired recipient; performing image recognition on the captured image data to identify the recipient image; matching the recipient image with corresponding contact information to obtain address information for the at least one desired recipient; and addressing an electronic communication to the at least one desired recipient using the address information, where the electronic communication comprises the captured image data for the physical content.

In a further exemplary embodiment, an apparatus comprising: at least one processor; and at least one memory including computer program code, the at least one memory and the computer program code being configured to, with the at least one processor, cause the apparatus at least to perform: capturing image data for physical content, where the physical content includes a recipient image indicative of at least one desired recipient; performing image recognition on the captured image data to identify the recipient image; matching the recipient image with corresponding contact information to obtain address information for the at least one desired recipient; and addressing an electronic communication to the at least one desired recipient using the address information, where the electronic communication comprises the captured image data for the physical content.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

In view of the above-described communication systems and techniques, it would be desirable to provide communication systems and techniques that further improve on the interface between physical media and electronic communication.

The exemplary embodiments of the invention provide novel techniques for electronic communication that correspond to physical content, and, in at least one exemplary embodiment, the addressing of digital media using customized physical postage stamps. In one, non-limiting exemplary embodiment, a customized, physical postage stamp is used for the purpose of addressing a physical communication (e.g., a physical letter or photograph) that is to be transmitted electronically (e.g., as an image, an image attached to an e-mail, a digital photograph). In such a manner, image-based addressing (e.g., optical recognition of an image that corresponds to an address and/or contact information) can be used to provide an electronic transmission corresponding to physical content or media. In further exemplary embodiments, the physical content may be "stamped" to indicate that it has been (electronically) transmitted.

Figure 1:
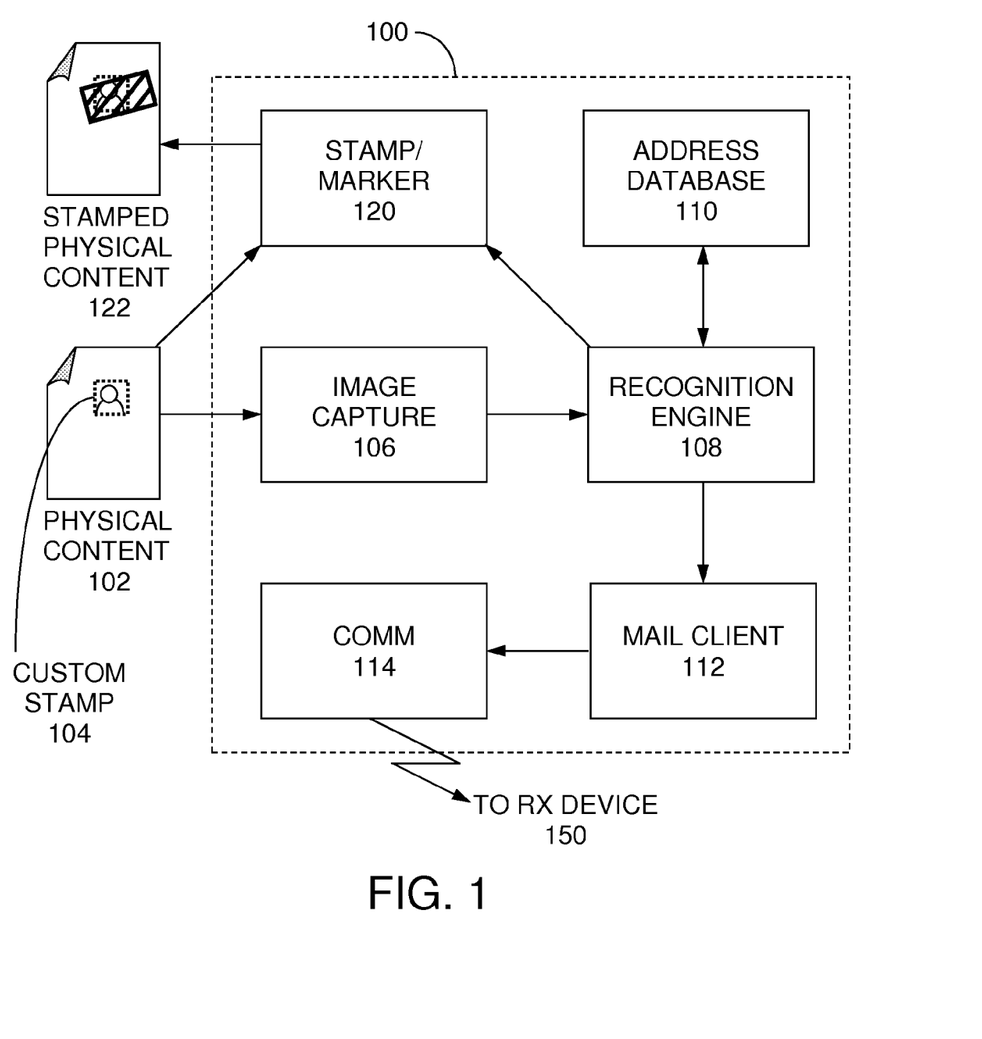
FIG. 1 depicts an exemplary system that is suitable for use in practicing the exemplary embodiments of the invention.

FIG. 1 depicts an exemplary system 100 that is suitable for use in practicing the exemplary embodiments of the invention. The system 100 receives physical content 102 as an input. As non-limiting examples, the physical content 102 may comprise a letter or postcard. In accordance with the exemplary embodiments of the invention, at least one custom stamp 104 is affixed to the physical content 102. The at least one custom stamp 104 identifies and/or indicates one or more recipients for the physical content 102. As a non-limiting example, an individual custom stamp 104 may identify only one recipient such that multiple custom stamps are affixed for multiple recipients. As a further non-limiting example, an individual custom stamp 104 may identify a plurality of recipients (e.g., multiple images per custom stamp, multiple addresses or address information corresponding to a single stamp).

An image capture component 106 of the exemplary system 100 creates an image of the physical content 102, including the custom stamp 104. As non-limiting examples, the image capture component 106 may comprise a camera or a scanner. The image of the physical content 102 is passed to a recognition engine 108. The recognition engine 108 performs image recognition in order to locate the custom stamp 104 (e.g., locate it in the image of the physical content). The recognition engine 108 is also coupled to an address database 110 that stores contact information and at least one image associated with the contact. The recognition engine 108 can obtain contact information (from the address database 110) that corresponds to the image contained in the custom stamp 104. Thus, the recognition engine 108 uses the custom stamp 104 to obtain contact information for the recipient (e.g., one or more recipients) corresponding to the image on the custom stamp 104.

The recognition engine 108 passes the obtained contact information and the image of the physical content 102 to a mail client 112. The mail client 112 packages the image of the physical content 102 in a message (e.g., as an attachment) and addresses the message based on the contact information (to the recipient(s) corresponding to the custom stamp 104). The mail client 112 then sends the message to the recipient(s) (e.g., a receiving device 150) via a communications component (COMM) 114. As non-limiting examples, the message may comprise an e-mail, a multimedia message service (MMS), a short message service (SMS), a text message or other such notification. As a non-limiting example, the image of the physical content 102 may be attached to the message. Alternatively as a non-limiting example, an image of the physical content may be automatically printed to a piece of paper for the recipient upon receipt of the message.

Optionally, the exemplary system 100 further may comprise a stamp/marker component 120. The stamp/marker component 120 stamps the physical content 102 (e.g., producing the stamped physical content 122) after the image is captured by the image capture component 106 (e.g., after the message is sent to the receiving device 114) in order to indicate that the physical content 102 has been sent (e.g., to the recipient identified by the custom stamp 104). In some exemplary embodiments, the stamp/marker component 120 is actuated by (in response to) a signal from the recognition engine 108 (as shown in FIG. 1) or the mail client 112, the signal indicating successful transmission of the message with the image of the physical content 102.

While shown in FIG. 1 as a local component, in other exemplary embodiments the recognition engine 108 instead may comprise a remote component that is accessed by the exemplary system 100 (e.g., via wireless communication, wired communication, the internet). A remote recognition engine may enable multiple, distant users to share a common engine.

As non-limiting examples, the COMM 114 may comprise at least one transceiver, at least one wireless transceiver, a modem and/or another communications component. The message may be transmitted using any suitable communication and/or communication system, such as a wireless communication system, a wired communication system, the internet, a cellular communication system, a local area network (LAN), a wireless LAN, a wide area network (WAN), a Bluetooth® communication, an infrared (IR) communication and/or a device-to-device (D2D) communication, as non-limiting examples.

One or more of the components of the exemplary system 100 may be embodied in one or more circuits, integrated circuits, circuitry, processors, digital processors and/or processing blocks. One or more of the components of the exemplary system 100 may be embodied in one or more computer programs and/or computer program code (e.g., run by at least one processor, stored on a computer readable medium such as a memory). One or more of the components of the exemplary system 100 may be embodied in a wireless communications device, such as a mobile phone or a cellular phone, as non-limiting examples. For example, the image capture component 106 (e.g., a camera, a scanner, a photocopier), the recognition engine 108 (e.g., a computer program run by a processor), the address database 110 (e.g., stored on a memory), the mail client 112 (e.g., a computer program run by a processor) and the COMM 114 (e.g., at least one wireless transceiver coupled to at least antenna) may be embodied in a wireless communications device that is part of or comprises the exemplary system 100.

While shown in FIG. 1 as including an address database 110, in other exemplary embodiments the exemplary system 100 may not include or be connected to an address database 110. As a non-limiting example, the custom stamp 104 itself may have the address (e.g., an e-mail address, a phone number, a number sending a text message) printed on it. As an example, the e-mail address or phone number may be printed in small text on the stamp, such as in a border that is close to (e.g., a little interior of) the edge of the custom stamp, for example. In such a case, the recognition engine 108 need only obtain (e.g., recognize) the address from the custom stamp in order to correctly address the communication.

Figure 2:
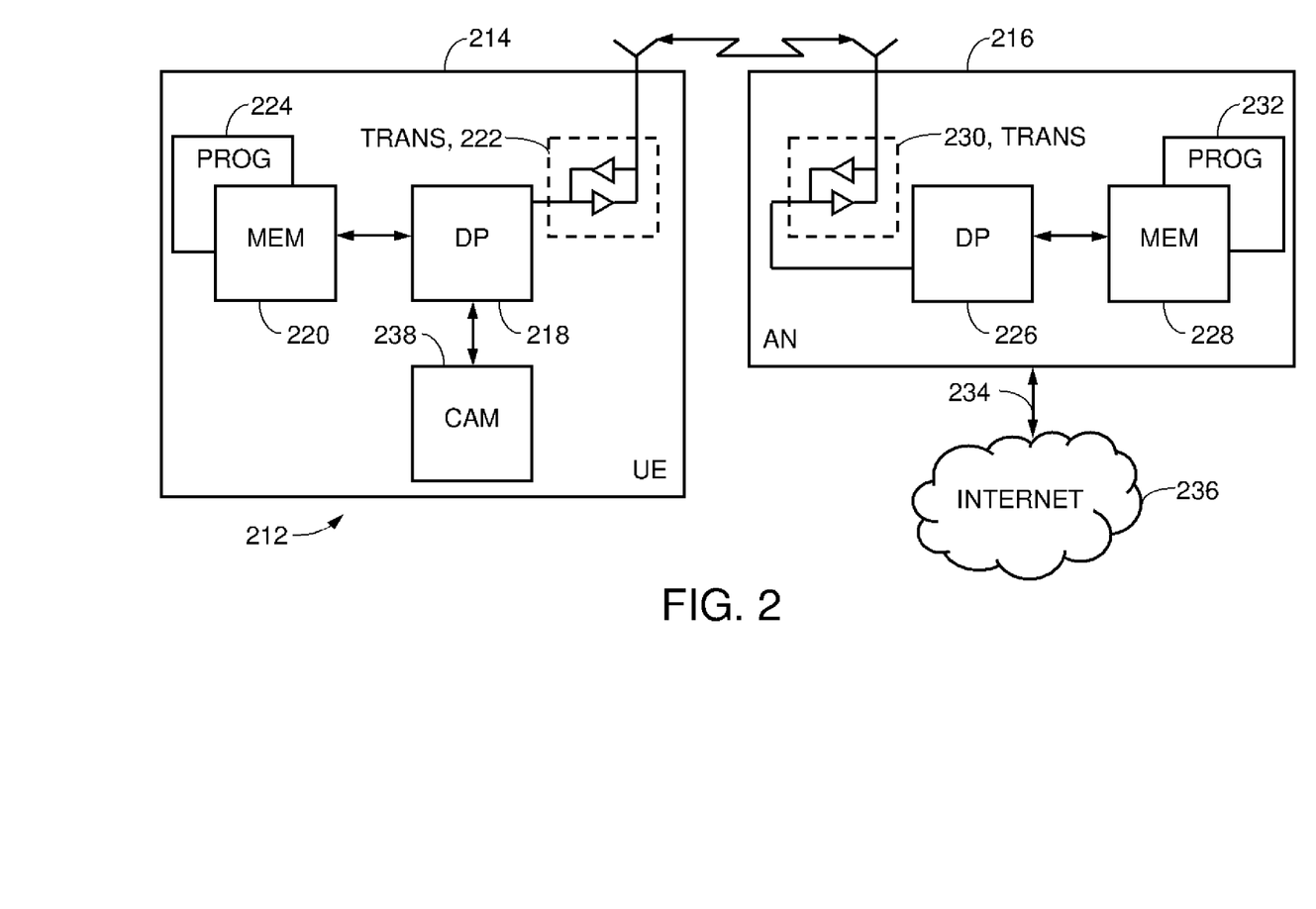
FIG. 2 illustrates a simplified block diagram of an electronic device that is suitable for use in practicing the exemplary embodiments of this invention.

Reference is made to FIG. 2 for illustrating a simplified block diagram of various electronic devices that are suitable for use in practicing the exemplary embodiments of this invention. In FIG. 2, a wireless network 212 is adapted for communication with a user equipment (UE) 214 via an access node (AN) 216. The UE 214 includes a data processor (DP) 218, a memory (MEM) 220 coupled to the DP 218, and a suitable RF transceiver (TRANS) 222 (having a transmitter (TX) and a receiver (RX)) coupled to the DP 218. The MEM 220 stores a program (PROG) 224. The TRANS 222 is for bidirectional wireless communications with the AN 216. Note that the TRANS 222 has (e.g., is coupled to) at least one antenna to facilitate communication. Also coupled to the DP 218 is an image capture component, such as a camera (CAM) 238, for example. The CAM 238 enables the UE 214 to capture an image (e.g., image data). The captured image may be stored in the MEM 220 and/or transmitted, via the TRANS 222, to another device (e.g., another UE). In other exemplary embodiments, the image capture component may comprise a scanner or a photocopier.

The AN 216 includes a data processor (DP) 226, a memory (MEM) 228 coupled to the DP 226, and a suitable RF transceiver (TRANS) 230 (having a transmitter (TX) and a receiver (RX)) coupled to the DP 226. The MEM 228 stores a program (PROG) 232. The TRANS 230 is for wireless communication with the UE 214. Note that the TRANS 230 has (e.g., is coupled to) at least one antenna to facilitate communication. The AN 216 is coupled via a data path 234 to one or more external networks or systems, such as the internet 236, for example.

The PROG 224 is assumed to include program instructions that, when executed by the associated DP 218 enables the respective electronic device to operate in accordance with the exemplary embodiments of this invention, as discussed herein.

In general, the various exemplary embodiments of the UE 214 can include, but are not limited to, mobile nodes, mobile stations, mobile phones, cellular phones, personal digital assistants (PDAs) having wireless communication capabilities, mobile routers, relay stations, relay nodes, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

While shown in FIG. 2 as a wireless communication device, in other exemplary embodiments the UE 214 may utilize wired communications, for example, via a wired network connection and/or a modem.

The exemplary embodiments of this invention may be implemented by computer software executable by the DP 218 of the UE 214, or by hardware, or by a combination of software and hardware.

The MEMs 220, 228 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The DPs 218, 226 may be of any type suitable to the local technical environment, and may include one or more of general purpose computers, special purpose computers, microprocessors, digital signal processors (DSPs) and processors based on a multi-core processor architecture, as non-limiting examples.

While described above in reference to memories (MEMS 220, 228), these components may generally be seen to correspond to storage devices, storage circuits, storage components and/or storage blocks. In some exemplary embodiments, these components may comprise one or more computer-readable mediums, one or more computer-readable memories and/or one or more program storage devices.

While described above in reference to data processors (DPs 218, 226), these components may generally be seen to correspond to processors, processing devices, processing components, processing blocks, circuits, circuit devices, circuit components, circuit blocks, integrated circuits and/or chips (e.g., chips comprising one or more circuits or integrated circuits).

Figure 3:
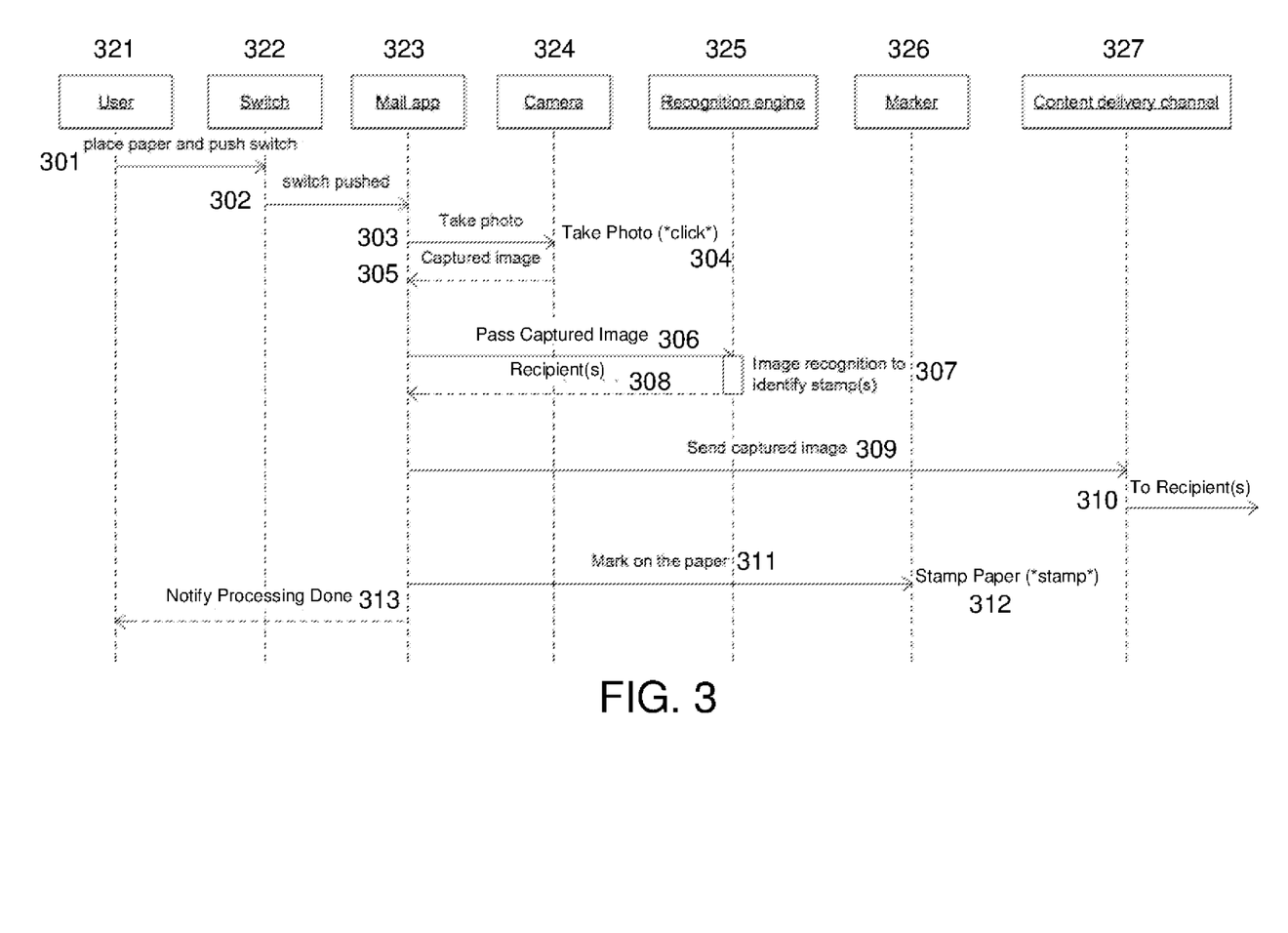
FIG. 3 shows a sequence diagram of outgoing processing (i.e., transmission side) for another exemplary system that is suitable for practicing the exemplary embodiments of the invention.

FIG. 3 shows a sequence diagram of outgoing processing (i.e., transmission side) for another exemplary system that is suitable for practicing the exemplary embodiments of the invention. At step 301, a user 321 places the paper (physical content to be transmitted) in the reception area (e.g., under the camera or scanner) and pushes a switch 322. The paper includes at least one custom stamp to identify the recipient (addressee) of the paper. Actuation of the switch 322 triggers (302) a mail application (mail app) 323 to instruct (303) a camera 324 to take a picture (304). The camera 324 sends (305) the captured image (e.g., image data) to the mail app 323.

The mail app 323 passes (306) the captured image to a recognition engine 325 for image recognition (307) to identify the at least one stamp and, therefrom, the intended recipient(s). The recognition engine 325 may be local or remote. The recognition engine 325 sends (308) contact information for the recipient(s) back to the mail app 323. The mail app 323 then sends (309) the captured image to the recipient(s) (310) via a content delivery channel 327. As a non-limiting example, the content delivery channel 327 may comprise a communications network (e.g., wireless) coupled to the internet. After sending the captured image to the recipient(s) (e.g., after step 309), the mail app 323 instructs (311) a marker 326 (e.g., a rubber stamp) to stamp the paper (312). The mail app 323 then notifies (313) the user that the processing is done. As a non-limiting example, the notification may comprise any suitable light (e.g., activation of one or more lights or light emitting diodes), sound (e.g., a beep or other noise generated by a speaker or buzzer, such as a piezoelectric buzzer, for example), motion (e.g., vibration or movement of a lever using, for example, a servo) or textual (e.g., using a display to show one or more letters, numbers or symbols) indicator.

As a non-limiting example, the system described above in reference to FIG. 3 may be embodied within an apparatus that resembles a mailbox. The switch may comprise a flag whereby actuation of the switch is accomplished by a user raising the flag in the mailbox (e.g., similar to the conventional U.S. system that is used to indicate that there is mail in a mailbox to be collected by a postal employee).

Figure 4:
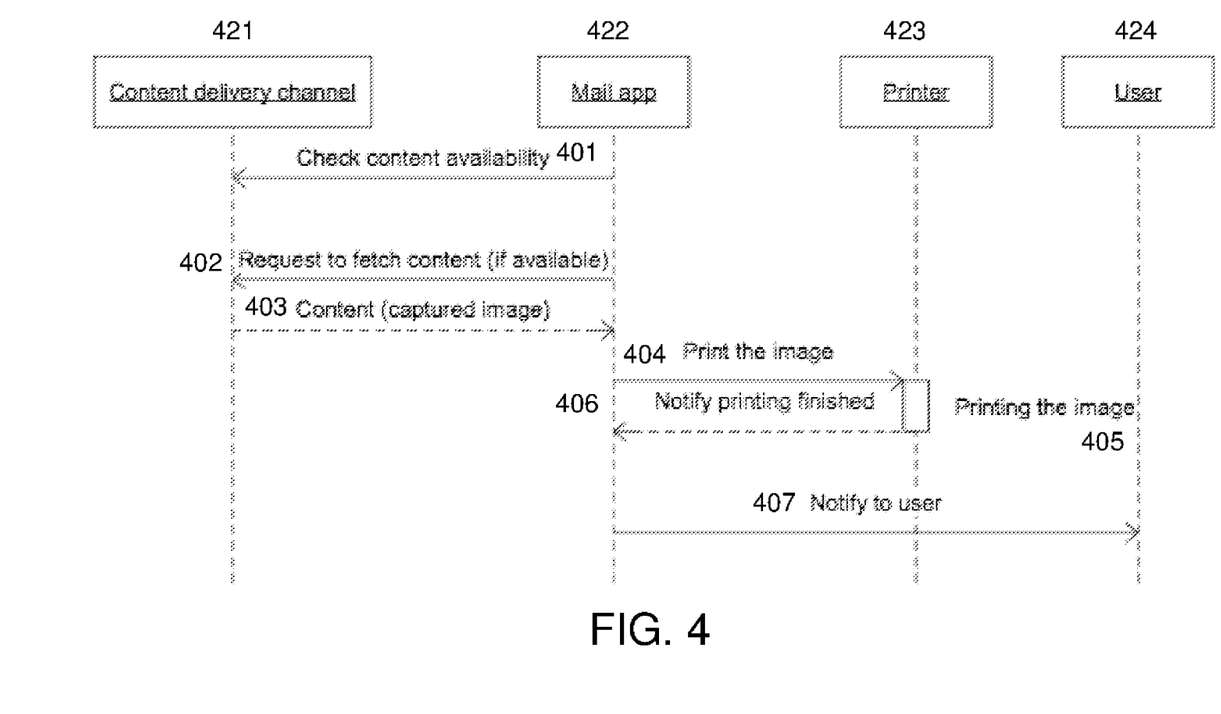
FIG. 4 shows a sequence diagram of incoming processing (i.e., reception side) for another exemplary system that is suitable for practicing the exemplary embodiments of the invention.

FIG. 4 shows a sequence diagram of incoming processing (i.e., reception side) for another exemplary system that is suitable for practicing the exemplary embodiments of the invention. A mail application (mail app) 422 in the receiving device checks (401) content availability from a content delivery channel 421. In response to learning (e.g., detecting, discovering, receiving a notification) that content is available, the mail app 422 sends (402) a request to fetch the content and, subsequently, receives (403) the content which includes a captured image (e.g., as an attachment to an e-mail). The mail app 422 sends (404) the captured image to a printer 423 for printing (405). The printer 423 notifies (406) the mail app 422 when the printing is complete. The mail app 422 then notifies (407) a user 424 regarding the communication. In other exemplary embodiments, the image may be printed by the printer 423 in response to the user 424 requesting that the image be printed (e.g., the user selecting a print command within the mail app 422).

It should be noted that the exemplary embodiment described above in reference to FIG. 4 is particularly useful when a physical copy of the communication is desired. For example, the system of FIG. 4 may be utilized to provide a paper copy of the communication to the recipient(s) (e.g., arriving in the recipient's physical mailbox or physical inbox). In such an exemplary system, the arrival notification may be helpful in alerting the recipient that a communication (e.g., the printed copy of the communication) has arrived.

As a further example of a non-limiting, exemplary embodiment of the invention, a user may go to a website and select certain contacts (e.g., "favorite people") whose profile images (e.g., portraits of the corresponding contacts) are used to print customized stamps on a sticker printer (e.g., adhesive stamps). The user can physically affix the stamps to a piece of paper that is intended for the contact (e.g., the person pictured on the customized stamp). A photograph of the paper is then taken, said photograph naturally including the customized stamp affixed to the paper. The photograph is analyzed by software that recognizes the customized stamp (e.g., recognizes the image or face on the stamp) and correlates the image with an address for the contact (e.g., an e-mail address). The photograph is then sent (e.g., automatically, e-mailed) to the contact.

If multiple stamps for different contacts are affixed to a single paper or page, a digital representation (e.g., photograph) of the paper may be sent to multiple recipients (e.g., each address that corresponds to a customized stamp on the paper). In other exemplary embodiments, an individual stamp may include and/or correspond to more than one person (e.g., a group of people, an organization, a mailing list). In further exemplary embodiments, the stamp may correspond to a keyword that is associated with at least one contact. In such a manner, a user could send a single paper to a desired group of contacts using a single stamp.

The mapping between the image on the stamp and contact information (e.g., one or more addresses) may be accomplished using any suitable technique that is appropriate for the environment and type of communication. For example, the creator of the stamp may explicitly specify (e.g., create) the mapping (e.g., by filling out a form or web form that includes the image/photo and one or more addresses). As another example, a search may be performed (e.g., by the recognition engine) in order to locate the correct correspondence. For example, the system may search a local, distant, private or public database. As a non-limiting example, the system may search a database of Facebook® profile pictures. As a further non-limiting example, based on the results of such a search (e.g., Facebook® accounts), the system may use the Facebook® accounts as destinations for the content. As another non-limiting example, the system may match the stamp's image to known images and addresses from a local database. As a further non-limiting example, a public database may be established whereby individuals can submit contact information and a representative image (e.g., a photograph of the individual) to be used for such customized stamps. Such a public database thus could be searchable in order to determine correspondence with an image on a stamp and obtain contact information.

In other exemplary embodiments, the stamps may have reference markings to provide or assist in image recognition. As non-limiting examples, the reference markings may comprise one or more: bar codes, coded blocks, encodings, encoded messages, encoded indicia, known indicia, alphanumeric characters and/or other linguistic characters or symbols. In further exemplary embodiments, the stamps may include, comprise and/or be printed using different inks (e.g., photoreactive inks), such as infrared inks or reactive inks (e.g., luminescent inks), for example. As a non-limiting example, a barcode containing information or indicia for the recipient may be printed over the stamp (e.g., over the image on the stamp) using infrared ink. This would make the barcode visible to a camera sensor while remaining invisible to the naked eye.

In other exemplary embodiments, the stamps may include some indicia (e.g., a two dimensional barcode) adjacent to the image on the stamp and containing information about the recipient. In further exemplary embodiments, assuming the image for the recipient is a picture or photograph of the recipient's face, face recognition techniques may be used to automatically identify the face of the recipient pictured on the stamp.

In some exemplary embodiments, the customized stamps may have one or more features to assist with location and recognition of the stamp. For example, the stamps may have reference markings (e.g., similar to those found in two dimensional barcodes) along the edges of the stamp. In further exemplary embodiments, edge-detection techniques may be utilized to identify document and/or stamp boundaries. Such techniques may assist, for example, by allowing a printer to adjust the scale and rotation of the document image in order to maximize its size and correct alignment within a printed output (e.g., on paper). In other exemplary embodiments, reference markers may be provided (e.g., printed) on the paper of the document in order to assist in detection of the document's boundaries (edges). In further exemplary embodiments, the location and orientation of the customized stamp may be standardized to assist in stamp-detection and recognition.

The contact information (e.g., address) may comprise any suitable address information including, but not limited to: a digital address, an e-mail address, MMS, SMS, a phone number, a phone number for a text message, a fax number, a public or private account established by or for the contact (e.g., a Facebook® account), a messaging system, a message delivery system, a digital message delivery system and/or a voicemail system. The message used to deliver the content may comprise any suitable media or communication including, but not limited to: photographs, text, symbols, audio recordings and/or video recordings.

In other exemplary embodiments, the image data may be uploaded to a storage location for subsequent access by the addressee. For example, upon capturing the image and obtaining the address(es) of the one or more desired recipients, the image may be uploaded and stored on a remote server. The message to the recipient may note that the recipient has a new message/postcard/image, for example. In some exemplary embodiments, the message also identifies one or more of the storage location, sender, file size, file type and/or transmission date. The recipient can access the image via alternate communication techniques (e.g., file transfer protocol (ftp), hypertext transport protocol (http), secure storage techniques, a web browser, a specialized client). In such a manner, if the image size is too large for ready transmission (e.g., as part of a text message), the recipient can access the image via one or more alternate communication channels.

In other exemplary embodiments, a user can control or select image quality and/or image format for the captured image (e.g., quality of the captured image, resolution of the captured image, size of the captured image, a scaling of quality vs. size). Such control may be desirable if the file size of the image to be transmitted were important (e.g., based on the communication medium in use). The captured image may be stored (e.g., locally, non-locally) using any suitable electronic file format or media including, as non-limiting examples: JPEG, JPG, JPE, JFIF, GIF, TIF, TIFF, BMP, PNG, ICO, PICT, PDF, Photoshop® file formats, other image file formats and/or other file formats that are capable of storing or embedding images (e.g., .DOC, .DOCX, .PPT, .PPTX, .XLS, .XLSX).

In further exemplary embodiments, additional interfaces may be used to extend the functionality of the system(s). For example, a paper or postcard could be scanned in and, using optical character recognition (OCR), digitized. The resulting digitized text could be transmitted to the recipient where a text-to-speech engine is applied in order to produce an audio output.

In other exemplary embodiments, the system may replace the stamp image during processing and/or transmission. For example, the image for the recipient may be replaced or overlayed (e.g., if the sender did not accurately place the sender's return address stamp, though special printer paper may require more accurate placement of the return address stamp) by an image indicating the sender (e.g., source, originator, author). In such a manner, the recipient may be able to remove the stamp on the output (e.g., the paper copy of the communication) and use it to address a response (e.g., send a response to the sender). In further exemplary embodiments, to support bilateral exchanges (e.g., back-and-forth correspondence) a mailbox may have special printer paper that features a removable adhesive stamp. The stamp is printed with the sender's image (e.g., the sender's stamp image is printed as part of receiving and printing the initial communication). In other exemplary embodiments, if the communication is transmitted using e-mail or some other form of electronic communication, the system may indicate that the message is addressed to a physical mailbox (e.g., the system in FIG. 4) by embedding a special code in or with the e-mail.

It should be understood that any and all references herein to a customized stamp may further be seen to correspond to a customizable stamp or a stamp that includes one or more images or other indicia identifying the desired recipient(s) of the communication. It should further be understood that such a customized stamp is particularly useful in conjunction with electronic and/or digital techniques for communicating information (e.g., image data corresponding to the content in question) between people over distances. In addition, any and all references to a "stamp" should be understood generally to correspond to any writing, printing, image or adhesive (e.g., sticker) that is suitable for the stated purpose.

The exemplary techniques described herein provide a number of improvements for the interface between physical content and electronic communications, as well as a number of advantages over prior art systems and techniques. For example, the exemplary embodiments of the invention allow a user to easily address physical objects to recipients with digital addresses. Furthermore, the exemplary techniques described herein are more intuitive and easier to use than prior art techniques (e.g., navigating a menu system, typing in addresses, etc.). For example, utilizing the exemplary embodiments of the invention, even a young child or someone who is illiterate could send information (e.g., physical content, physical media) electronically.

Below are provided further descriptions of various non-limiting, exemplary embodiments. The below-described exemplary embodiments are separately numbered for purposes of clarity. This numbering should not be construed as wholly separating the below descriptions since various aspects of one or more exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein.

Figure 5:
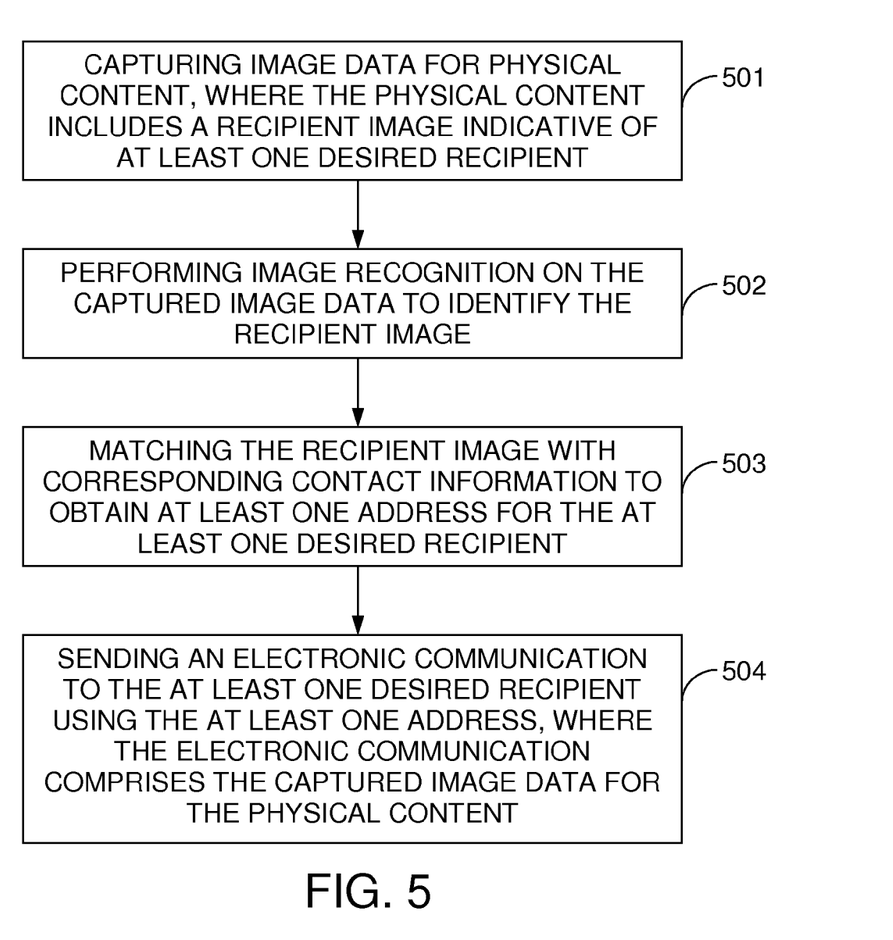
FIG. 5 depicts a flowchart illustrating one non-limiting example of a method for practicing the exemplary embodiments of this invention.

(1) In one non-limiting, exemplary embodiment, and with reference to FIG. 5, a method comprising: capturing image data for physical content, where the physical content includes a recipient image indicative of at least one desired recipient (501); performing image recognition on the captured image data to identify the recipient image (502); matching the recipient image with corresponding contact information to obtain at least one address for the at least one desired recipient (503); and sending an electronic communication to the at least one desired recipient using the at least one address, where the electronic communication comprises the captured image data for the physical content (504).

A method as above, where the physical content comprises at least one of a letter, a postcard or a paper. A method as in any above, where the recipient image comprises a customized stamp, a customizable stamp, a sticker or an adhesive item (e.g., an adhesive paper). A method as in any above, where the recipient image comprises a first recipient image and the at least one desired recipient comprises at least one desired first recipient, and where the physical content further comprises a second recipient image indicative of at least one desired second recipient. A method as in any above, where matching comprises consulting a database that includes the at least one address and the recipient image and indicates a correspondence therebetween. A method as in any above, where the electronic communication comprises an e-mail, a MMS, a SMS, a text message or a digital communication. A method as in any above, where the electronic communication comprises a message having the captured image data attached thereto. A method as in any above, further comprising: stamping the physical content to indicate the sending (transmission) of the electronic communication. A method as in any above, where capturing is performed by a camera or a scanner.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method.

A method as in any above, further comprising one or more additional aspects of the exemplary embodiments of the invention as described herein.

(2) In another exemplary embodiment, a program storage device readable by a machine, tangibly embodying a program of instructions executable by the machine for performing operations, said operations comprising: capturing image data for physical content, where the physical content includes a recipient image indicative of at least one desired recipient (501); performing image recognition on the captured image data to identify the recipient image (502); matching the recipient image with corresponding contact information to obtain at least one address for the at least one desired recipient (503); and sending an electronic communication to the at least one desired recipient using the at least one address, where the electronic communication comprises the captured image data for the physical content (504).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more additional aspects of the exemplary embodiments of the invention as described herein.

(3) In another exemplary embodiment, an apparatus comprising: at least one processor; and at least one memory including computer program code, the at least one memory and the computer program code configured to, with the at least one processor, cause the apparatus at least to perform: capturing image data for physical content, where the physical content includes a recipient image indicative of at least one desired recipient; performing image recognition on the captured image data to identify the recipient image; matching the recipient image with corresponding contact information to obtain at least one address for the at least one desired recipient; and sending an electronic communication to the at least one desired recipient using the at least one address, where the electronic communication comprises the captured image data for the physical content.

An apparatus as in any above, further comprising one or more additional aspects of the exemplary embodiments of the invention as described herein.

(4) In another exemplary embodiment, an apparatus comprising: means for capturing (e.g., a camera or a scanner) image data for physical content, where the physical content includes a recipient image indicative of at least one desired recipient; means for performing image recognition (e.g., at least one processor) on the captured image data to identify the recipient image; means for matching (e.g., at least one processor) the recipient image with corresponding contact information to obtain at least one address for the at least one desired recipient; and means for sending (e.g., at least one transmitter or transceiver) an electronic communication to the at least one desired recipient using the at least one address, where the electronic communication comprises the captured image data for the physical content.

An apparatus as in any above, further comprising one or more additional aspects of the exemplary embodiments of the invention as described herein.

(5) In another exemplary embodiment, an apparatus comprising: image circuitry configured to capture image data for physical content, where the physical content includes a recipient image indicative of at least one desired recipient; image recognition circuitry configured to perform image recognition on the captured image data to identify the recipient image; matching circuitry configured to match the recipient image with corresponding contact information to obtain at least one address for the at least one desired recipient; and transmission circuitry configured to send an electronic communication to the at least one desired recipient using the at least one address, where the electronic communication comprises the captured image data for the physical content.

An apparatus as in any above, further comprising one or more additional aspects of the exemplary embodiments of the invention as described herein.

(6) In another exemplary embodiment, a method, program storage device (readable by a machine and tangibly embodying a program of instructions executable by the machine for performing operations) and/or apparatus (comprising at least one processor and at least one memory including computer program code, the at least one memory and the computer program code configured to, with the at least one processor, cause the apparatus at least to perform; comprising at least one processor, at least one transceiver or communications component and/or at least one memory; comprising various means for performing the operations; or comprising various circuitries configured to perform the operations), with operations comprising: capturing image data for physical content, where the physical content includes a recipient image indicative of at least one desired recipient; performing image recognition on the captured image data to obtain at least one destination address for the at least one desired recipient; and sending an electronic communication to the at least one desired recipient using the at least one destination address, where the electronic communication comprises the captured image data for the physical content.

The method, program storage device and/or apparatus as above, where performing image recognition on the captured image data to obtain the at least one destination address for the at least one desired recipient further comprises matching the recipient image with corresponding contact information to obtain the at least one destination address for the at least one desired recipient. The method, program storage device and/or apparatus as in any above, further comprising one or more additional aspects of the exemplary embodiments of the invention as described herein.

Figure 6:
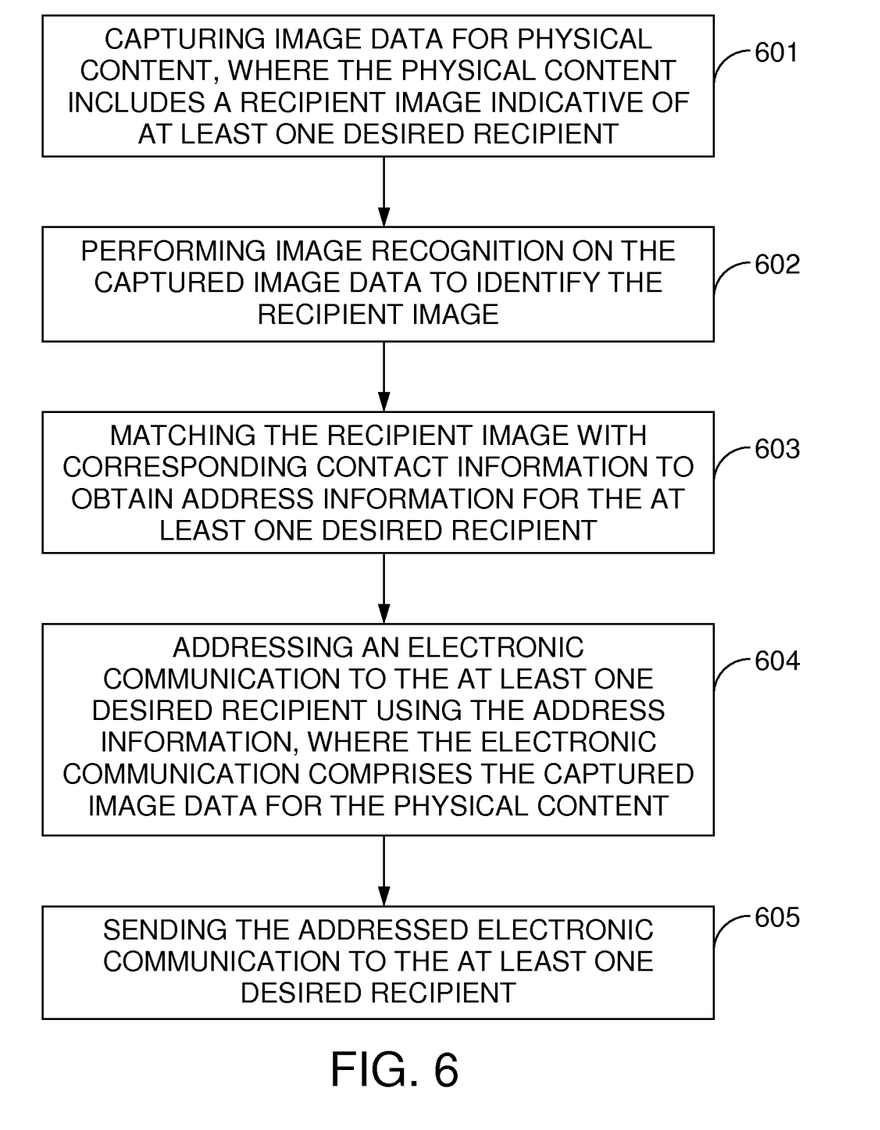
FIG. 6 depicts a flowchart illustrating another non-limiting example of a method for practicing the exemplary embodiments of this invention.

(7) In one non-limiting, exemplary embodiment, and with reference to FIG. 6, a method comprising: capturing image data for physical content, where the physical content includes a recipient image indicative of at least one desired recipient (601); performing image recognition on the captured image data to identify the recipient image (602); matching the recipient image with corresponding contact information to obtain address information for the at least one desired recipient (603); and addressing an electronic communication to the at least one desired recipient using the address information, where the electronic communication comprises the captured image data for the physical content (604).

A method as above, further comprising: sending (e.g., transmitting) the addressed electronic communication to the at least one desired recipient (605). A method as in any above, where the physical content comprises at least one of a letter, a postcard or a paper. A method as in any above, where the recipient image comprises a customized stamp, a customizable stamp, a sticker or an adhesive item (e.g., an adhesive paper). A method as in any above, where the recipient image comprises a first recipient image and the at least one desired recipient comprises at least one desired first recipient, and where the physical content further comprises a second recipient image indicative of at least one desired second recipient. A method as in any above, where matching comprises consulting a database that includes the address information and the recipient image and indicates a correspondence therebetween. A method as in any above, where the electronic communication comprises an e-mail, a MMS, a SMS, a text message, a fax or a digital communication. A method as in any above, where the electronic communication comprises a message having the captured image data attached thereto. A method as in any above, further comprising: stamping the physical content to indicate the sending (transmission) of the electronic communication. A method as in any above, where capturing is performed by a camera, scanner or photocopier. A method as in any above, where addressing the electronic communication comprises filling in a destination field of the electronic communication with at least a portion of the address information. A method as in any above, where the address information comprises at least one of an e-mail address, a phone number, a text number, a SMS number, an account name, a personal identifier, a personal identifier code, a routing code and a name.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method.

A method as in any above, further comprising one or more additional aspects of the exemplary embodiments of the invention as described herein.

(8) In another exemplary embodiment, a program storage device readable by a machine, tangibly embodying a program of instructions executable by the machine for performing operations, said operations comprising: capturing image data for physical content, where the physical content includes a recipient image indicative of at least one desired recipient (601); performing image recognition on the captured image data to identify the recipient image (602); matching the recipient image with corresponding contact information to obtain address information for the at least one desired recipient (603); and addressing an electronic communication to the at least one desired recipient using the address information, where the electronic communication comprises the captured image data for the physical content (604).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more additional aspects of the exemplary embodiments of the invention as described herein.

(9) In another exemplary embodiment, an apparatus comprising: at least one processor; and at least one memory including computer program code, the at least one memory and the computer program code configured to, with the at least one processor, cause the apparatus at least to perform: capturing image data for physical content, where the physical content includes a recipient image indicative of at least one desired recipient; performing image recognition on the captured image data to identify the recipient image; matching the recipient image with corresponding contact information to obtain address information for the at least one desired recipient; and addressing an electronic communication to the at least one desired recipient using the address information, where the electronic communication comprises the captured image data for the physical content.

An apparatus as in any above, where the apparatus comprises a mobile device, a mobile phone, a cellular phone or a portable electronic device. An apparatus as in any above, further comprising one or more additional aspects of the exemplary embodiments of the invention as described herein.

(10) In another exemplary embodiment, an apparatus comprising: means for capturing (e.g., a camera or a scanner) image data for physical content, where the physical content includes a recipient image indicative of at least one desired recipient; means for performing image recognition (e.g., at least one processor) on the captured image data to identify the recipient image; means for matching (e.g., at least one processor) the recipient image with corresponding contact information to obtain address information for the at least one desired recipient; and means for addressing (e.g., at least one processor) an electronic communication to the at least one desired recipient using the address information, where the electronic communication comprises the captured image data for the physical content.

An apparatus as in any above, further comprising means for sending (e.g., at least one transmitter or transceiver) the addressed electronic communication to the at least one desired recipient. An apparatus as in any above, further comprising one or more additional aspects of the exemplary embodiments of the invention as described herein.

(11) In another exemplary embodiment, an apparatus comprising: image circuitry configured to capture image data for physical content, where the physical content includes a recipient image indicative of at least one desired recipient; image recognition circuitry configured to perform image recognition on the captured image data to identify the recipient image; matching circuitry configured to match the recipient image with corresponding contact information to obtain address information for the at least one desired recipient; and address circuitry configured to address an electronic communication to the at least one desired recipient using the address information, where the electronic communication comprises the captured image data for the physical content.

An apparatus as in any above, further comprising transmission circuitry configured to send the addressed electronic communication to the at least one desired recipient. An apparatus as in any above, further comprising one or more additional aspects of the exemplary embodiments of the invention as described herein.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device (e.g., a computer-readable medium, a memory) readable by a machine (e.g., a computer, a mobile station, a mobile device, a mobile node), tangibly embodying a program of instructions (e.g., a program, a computer program) executable by the machine for performing operations. The operations comprise steps of utilizing the exemplary embodiments or steps of the method.

The various blocks shown in FIGS. 5 and 6 may be viewed as method steps, as operations that result from operation of computer program code and/or as one or more coupled components (e.g., function blocks, circuits, integrated circuits, logic circuit elements) constructed to carry out the associated function(s). The blocks depicted in FIGS. 5 and 6 may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangement of the blocks shown in FIGS. 5 and 6 should be considered merely exemplary and non-limiting. It should be appreciated that the blocks depicted in FIGS. 5 and 6 may correspond to one or more functions and/or operations that may be performed in any order (e.g., any practicable, suitable and/or feasible order) and/or concurrently (e.g., as practicable, suitable and/or feasible) so as to implement one or more of the exemplary embodiments of the invention. In addition, one or more additional steps, functions and/or operations may be utilized in conjunction with those illustrated in FIGS. 5 and 6 so as to implement one or more further exemplary embodiments of the invention, such as those described in further detail herein.

That is, the non-limiting, exemplary embodiments of the invention shown in FIGS. 5 and 6 may be implemented, practiced or utilized in conjunction with one or more further aspects in any combination (e.g., any combination that is practicable, suitable and/or feasible) and are not limited only to the blocks, steps, functions and/or operations illustrated in FIGS. 5 and 6.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controllers, other computing devices and/or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings. However, all such and similar modifications of the teachings of this invention will still fall within the scope of the non-limiting and exemplary embodiments of this invention.

Furthermore, some of the features of the preferred embodiments of this invention could be used to advantage without the corresponding use of other features. As such, the foregoing description should be considered as merely illustrative of the principles, teachings and exemplary embodiments of this invention, and not in limitation thereof.

What is claimed is:

1. A method comprising:
capturing image data for physical content, wherein the physical content includes a photograph of at least one desired recipient;
performing facial recognition on the captured image data;
accessing a database comprising at least one picture of the at least one desired recipient and data that indicates a correspondence between the at least one picture and contact information of the at least one desired recipient;
matching the photograph of the at least one desired recipient with the at least one picture in the database of the at least one desired recipient based on the facial recognition to obtain corresponding contact information of the at least one desired recipient;
obtaining address information for the at least one desired recipient from the corresponding contact information;
modifying the captured image data by replacing the photograph of the at least one desired recipient with a sender image indicative of a sender of an electronic communication;
addressing the electronic communication to the at least one desired recipient using the address information, wherein the electronic communication comprises the modified captured image data for the physical content; and
sending the addressed electronic communication to the at least one desired recipient.

2. The method of claim 1, further comprising:
stamping the physical content to indicate the sending of the addressed electronic communication; and
receiving a second electronic communication addressed to the sender using the sender image.

3. The method of claim 1, wherein the photograph comprises a customized stamp, a customizable stamp, a sticker or an adhesive item, and wherein the electronic communication comprises an e-mail, a multimedia message service (MMS) message, a short message service (SMS) message, a text message, a fax or a digital communication.

4. The method of claim 1, wherein addressing the electronic communication comprises filling in a destination field of the electronic communication with at least a portion of the address information.

5. The method of claim 1, wherein the address information comprises at least one of an e-mail address, a phone number, a text number, a SMS number, an account name, a personal identifier, a personal identifier code, a routing code and a name.

6. The method of claim 1, wherein the photograph comprises a reference marking along an edge and wherein the performed image recognition uses the reference marking to identify a boundary of the photograph.

7. The method of claim 1, wherein accessing a database further comprises searching a social network for at least one picture of the at least one desired recipient.

8. The method of claim 1, wherein the sender image is associated with contact information of the sender in the database.

9. The method of claim 1, further comprising:
upon capturing the image data for the physical content, uploading the captured image data to a remote server, wherein the electronic communication further comprises information identifying a storage location of the uploaded captured image.

10. The method of claim 1, wherein matching the photograph comprises matching the photograph of at least two desired recipients with at least one picture in the database of the at least two desired recipients based on the facial recognition to obtain corresponding contact information of the at least two desired recipients, and wherein addressing the electronic communication comprises addressing the electronic communication to each of the at least two desired recipients using the address information.

11. The method of claim 1, wherein the modifying the captured image data comprises:
including at least one reference marking to assist a printer in adjusting alignment and/or sizing of the sender image with a stamp area on printer paper.

12. The method of claim 1, wherein the at least one picture in the database of the at least one desired recipient comprises at least one social network picture, wherein the corresponding contact information of the at least one desired recipient comprises at least one corresponding social network account for the at least one desired recipient, and wherein sending the addressed electronic communication comprises sending the electronic communication to the at least one corresponding social network account of the at least one desired recipient.

13. A program storage device tangibly embodying a program of instructions that, when executed by a machine, cause the machine to at least:
capture image data for physical content, wherein the physical content includes a photograph of at least one desired recipient;
perform facial recognition on the captured image data;
access a database comprising at least one picture of the at least one desired recipient and data that indicates a correspondence between the at least one picture and contact information of the at least one desired recipient;
match the photograph of the at least one desired recipient with the at least one picture in the database of the at least one desired recipient based on the facial recognition to obtain corresponding contact information of the at least one desired recipient;
obtain address information for the at least one desired recipient from the corresponding contact information;
modify the captured image data by replacing the photograph of the at least one desired recipient with a sender image indicative of a sender of an electronic communication;
address the electronic communication to the at least one desired recipient using the address information, wherein the electronic communication comprises the modified captured image data for the physical content; and
send the addressed electronic communication to the at least one desired recipient.

14. The program storage device of claim 13, wherein the instructions further cause the machine to:
stamp the physical content to indicate the sending of the addressed electronic communication; and
receive a second electronic communication addressed to the sender using the sender image.

15. The program storage device of claim 13, wherein the photograph comprises a customized stamp, a customizable stamp, a sticker or an adhesive item, and wherein the electronic communication comprises an e-mail, a multimedia message service (MMS) message, a short message service (SMS) message, a text message, a fax or a digital communication.

16. The program storage device of claim 13, wherein the address information comprises at least one of an e-mail address, a phone number, a text number, a SMS number, an account name, a personal identifier, a personal identifier code, a routing code and a name.

17. An apparatus comprising: at least one processor; and at least one memory including computer program code, the at least one memory and the computer program code being configured to, with the at least one processor, cause the apparatus to at least:
capture image data for physical content, wherein the physical content includes a photograph of at least one desired recipient;
perform facial recognition on the captured image data;
access a database comprising at least one picture of the at least one desired recipient and data that indicates a correspondence between the at least one picture and contact information of the at least one desired recipient;
match the photograph of the at least one desired recipient with the at least one picture in the database of the at least one desired recipient based on the facial recognition to obtain corresponding contact information of the at least one desired recipient;
obtain address information for the at least one desired recipient from the corresponding contact information;
modify the captured image data by replacing the photograph of the at least one desired recipient with a sender image indicative of a sender of an electronic communication;
address the electronic communication to the at least one desired recipient using the address information, wherein the electronic communication comprises the modified captured image data for the physical content; and
send the addressed electronic communication to the at least one desired recipient.

18. The apparatus of claim 17, wherein the at least one memory and the computer program code are configured to, with the at least one processor, cause the apparatus to at least:
stamp the physical content to indicate the sending of the addressed electronic communication; and
receive a second electronic communication addressed to the sender using the sender image.

19. The apparatus of claim 17, wherein the photograph comprises a sticker or an adhesive item.

20. The apparatus of claim 17, wherein the electronic communication comprises an e-mail, a multimedia message service (MMS) message, a short message service (SMS) message, a text message, a fax or a digital communication.

21. The apparatus of claim 17, wherein the apparatus comprises a mobile phone.

22. The apparatus of claim 17, wherein the sender image is associated with contact information of the sender in the database.

23. The apparatus of claim 17, wherein the at least one memory and the computer program code are configured to, with the at least one processor, cause the apparatus to at least:

upon capturing the image data for the physical content, upload the captured image data to a remote server, wherein the electronic communication further comprises information identifying a storage location of the uploaded captured image.

24. The apparatus of claim 17, wherein match the photograph comprises matching the photograph of at least two desired recipients with at least one picture in the database of the at least two desired recipients based on the facial recognition to obtain corresponding contact information of the at least two desired recipients, and wherein address the electronic communication comprises addressing the electronic communication to each of the at least two desired recipients using the address information.

* * * * *